Patented Oct. 2, 1945

2,385,787

UNITED STATES PATENT OFFICE 2,385,787

ARYLOXYDIHYDRONORPOLYCYCLOPENTADIENES

Herman A. Bruson, Philadelphia, Pa., assignor to The Resinous Products & Chemical Company, Philadelphia, Pa., a corporation of Delaware No Drawing. Application February 20, 1943, Serial No. 476,642

10 Claims. (Cl. 260—612)

This invention relates to aryloxydihydronorpolycyclopentadienes and to a process for their preparation from monohydric phenols and polycyclopentadienes having two double bonds per molecule.

It has been shown that phenols condense with indene, coumarone, or coal tar fractions which are rich in indene and coumarone and which may also contain varying amounts of dicyclopentadiene (Rivkin and Sheehan, J. Ind. Eng. Chem., 30, 1228 (1939)). As the result of the condensation, there are formed resins.

It has been found, however, that instead of resins there may be obtained well defined chemical compounds by reacting a polycyclopentadiene having two double bonds per molecule with a monohydric phenol in the presence of an acidic condensing agent. The reaction involves both addition of one reactant to another and rearrangement of the terminal endomethylene cycle of the polycyclopentadiene. As a result, there are formed aryl ethers of a nucleus belonging to a new ring system, which is here designated "norpolycyclopentadiene" and which will be more fully characterized hereinafter.

The addition-rearrangement reaction is conveniently illustrated with the reaction involving the simplest compounds of both classes of reactants. Thus, phenol reacts with dicyclopentadiene in the presence of boron trifluoride, sulfuric acid, or other acidic condensing agent, according to the following equation:

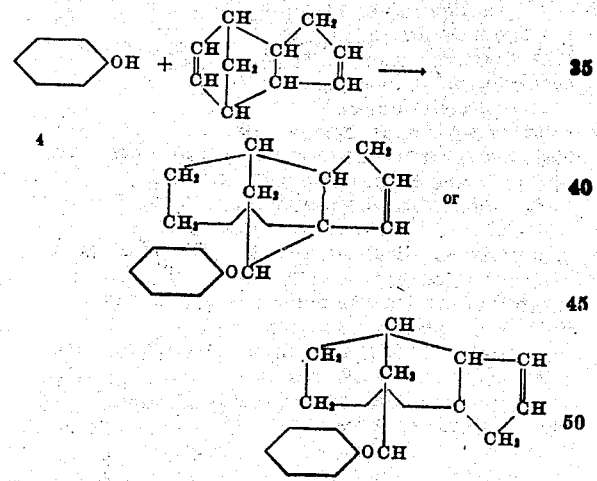

The first structure for the product is the more probable.

Similarly, tricyclopentadiene, tetracyclopentadiene, pentacyclopentadiene, and homologues and isomers thereof, individually or in mixtures, may be reacted with a monohydric phenol to give aryl ethers. The polycyclopentadienes having two double bonds per molecule are obtained as crystalline solids by heating cyclopentadiene at 150°–200° C. in a closed vessel. They have the following general structure:

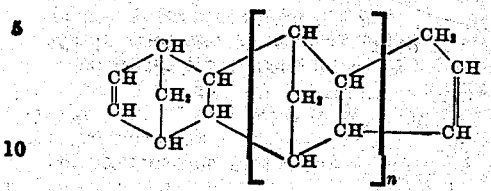

where $n$ is a number from zero to a small whole number, such as 1, 2 or 3.

The products of this invention are acid-catalyzed, addition-rearrangement products from a phenol and a polycyclopentadiene having two double bonds and one to four endomethylene cycles per molecule. They are aryl dihydronorpolycyclopentadienyl ethers having the general formula:

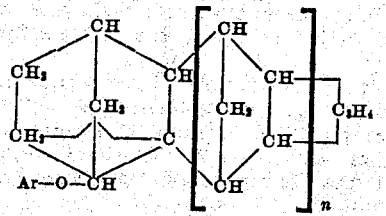

wherein $C_3H_4$ is a propylene group which in conjunction with the adjoining carbon atoms forms a cyclopenteno group and Ar is an aryl nucleus.

In place of phenol itself used in the above illustration, there may be used a substituted phenol, such as a phenol having one or more alkyl, aralkyl, aryl, cycloalkyl, alkoxy, alkoxyalkyl, aryloxy, halo-, acyl, or similar substituents. Suitable phenols include the ortho-, meta-, and para-cresols, the chlorophenols, including both mono- and poly-chloro-substituted phenols, the bromophenols, chlorocresols, bromocresols, tert.-butyl phenol, octyl phenol, diisobutyl phenol, dodecylphenol, methoxyphenol, ethoxyethyl phenol, β-naphthol, p-phenyl phenol, cyclohexyl phenol, benzyl phenol, acetyl phenol, or other monohydric phenol.

To promote the reaction between phenol and polycyclopentadiene, there is used an acidic condensing agent, typical of which are sulfuric acid, sulfuric acid esters, such as ethyl acid sulfate, sulfonic acids, such as toluene sulfonic acid or butyl sulfonic acid, hydrogen fluoride, boron trifluoride, coordination complexes of boron trifluoride and oxygenated compounds, such as boron trifluoride complexes of alcohols, ethers, esters, ketones, aldehydes, water, etc., Friedel-Crafts catalysts such as aluminum, iron, antimony, or titanium chlorides, tetraphosphoric acid and the like.

Among the most useful of all the catalysts or acidic condensing agents are boron trifluoride and its coordination complexes of oxygenated compounds. Typical complexes from ethers are $BF_3.C_2H_5OC_2H_5$ and $BF_3.C_4H_9O\text{---}C_4H_9$. These are colorless, fuming liquids which are readily soluble in the reaction mixture, do not form undesirable by-products, are readily removed upon completion of the reaction by a simple operation such as washing with water or washing with a solution of an alkaline agent, such as soda ash. Other typical complexes include such products as $BF_3.CH_3COCH_3$, $BF_3.2CH_3COOH$, $BF_3.(H_2O)_x$, where $x$ is one or two, $BF_3.C_4H_9OH$, etc.

The quantity of acidic condensing agent required is generally small. Amounts varying from 1 to 20 per cent. of the weights of the reactants are usually entirely satisfactory, although decreased or increased amounts may be used, commonly without marked advantage. The acidic condensing agent may desirably be removed following the reaction by extraction or neutralization.

The reactants and condensing agent may be mixed in any desired order. Since the reactions are exothermic, it is often advisable to cool the reaction mixture, particularly at the start, and/or to combine reactants or catalyst slowly, and/or to employ a suitable solvent or diluent, such as petroleum naphtha, or a chlorinated solvent, such as ethylene dichloride, chloroform, carbon tetrachloride, or the like. Solvents are of particular value in the case of phenols which are not themselves soluble in the polycyclopentadienes.

The reaction is performed at temperatures between about 0° and 100° C., the range of 25°-50° C. being preferred. In general, it is best to keep the reaction mixture below 85° C. at the start and use higher temperatures only to complete the reaction.

Under the conditions discussed, only one double bond of the two originally present in the polycyclopentadienes here described reacts with the hydroxyl group of the phenol. The reaction takes place only at the double bond of the terminal endomethylene cycle in spite of the apparent equivalency of the double bonds in the parent polycyclopentadiene. At the same time, under the influence of the acidic condensing agent, the aforementioned rearrangement takes place, forming new cycles, the structure of which has been established to be that shown in the above illustrative example.

The resulting aryloxydihydronorpolycyclopentadienes are useful as insecticides, as solvents, as plasticizers, and as intermediates for preparing drugs, resins, sulfonated wetting agents, etc. The residual double bond of the terminal five-membered cycle is still capable of reacting with hydrogen, chlorine, bromine, iodine chloride, iodine bromide, thiocyanogen, etc.

The invention is further illustrated by the following examples, giving details of the preparation of the new ethers. Parts are by weight.

*Example 1*

(a) To a stirred mixture of 132 parts of dicyclopentadiene and 94 parts of phenol, there was added dropwise during thirty minutes 18 parts of 98% sulfuric acid while the reaction mixture was maintained at 28°-32° C. by water cooling. The mixture was stirred thereafter for two hours, then poured into hot water. The oil layer which formed was separated and washed thoroughly with hot water and with soda solution. The oil was separated and dried and then mixed with 1 per cent. of its weight of dry sodium carbonate and distilled in vacuo. The fraction boiling at 140°-150° C./1 mm. was a pale yellow oil, obtained in an amount of 98 parts, which gradually solidified to a crystalline mass. After recrystallization from methanol and bleaching with charcoal, the product, identified as the phenoxydihydronordicyclopentadiene, formed colorless crystals, melting, when pure, at 70°-71° C., and having the probable formula:

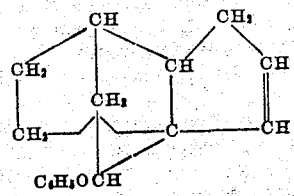

(b) To a mixture of 94 parts of phenol and 20 parts of tetraphosphoric acid ("Phospholeum"), which was rapidly stirred, 132 parts of dicyclopentadiene was gradually added during fifteen minutes while the reaction temperature was maintained at 35°-40° C. by cooling.

The mixture was then stirred for about one and one-half hours until the exothermal reaction ceased. Finally, the mixture was heated for two hours at 40°-50° C. to complete the reaction. The thick, dark liquid was washed with hot water and with soda solution and was distilled under reduced pressure. The phenoxydihydronordicyclopentadiene came over as a colorless oil at 140°-153° C./1-2 mm. in a yield of 95 parts. It solidified to a white crystalline mass on standing and, after recrystallization from methanol, formed colorless needles melting at 70°-71° C.

(c) To a solution of 1 part of $BF_3$ in 98 parts of phenol, 132 parts of dicyclopentadiene was added dropwise while the mixture was stirred and cooled so that the temperature did not exceed 75° C. The product was stirred for eight hours longer, then washed with hot water, neutralized with soda, dried, and distilled as above. The yield of phenoxydihydronordicyclopentadiene was 70 parts.

*Example 2*

A mixture consisting of 108 parts of orthocresol and 132 parts of dicyclopentadiene was stirred while 18 parts of 98% sulfuric acid was added dropwise thereto during thirty minutes at 30°-31° C. The mixture was stirred for two hours longer, then washed and distilled as described in Example 1. The o-methyl-phenoxydihydronordicyclopentadiene distilled over at 160°-170° C./2 mm. as a yellow oil which crystallized on standing. After recrystallization from methanol and bleaching with charcoal, it formed colorless crystals melting at 47°-48° C. and having the probable formula:

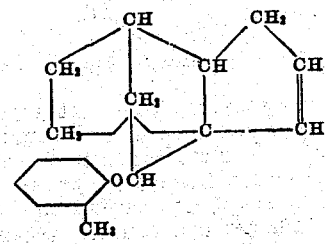

In a similar manner, meta-cresol gave the corresponding m-methylphenoxydihydronordicyclopentadiene, which boiled at 165°-167° C./3.5 mm.

and which crystallized from ethanol in colorless needles having a melting point of 69° C.

Example 3

A mixture of 132 parts of dicyclopentadiene and 128 parts of ortho-chlorophenol was treated at 28°–31° C. with 18 parts of 98% sulfuric acid as described in Example 1. The product obtained distilled over at 160°–175° C./1–2 mm. Upon redistillation, it boiled at 161°–163° C./1 mm. and solidified on standing. After recrystallization from methanol, the product, o-chlorophenoxydihydronordicyclopentadiene, separated in white crystals having a melting point of 56°–57° C. and possessing the probable formula:

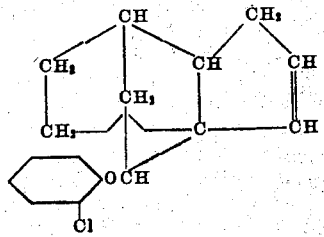

Example 4

To a solution of 132 parts of dicyclopentadiene, 260 parts of ethylene dichloride, and 150 parts of para-tertiary butyl phenol, there was added dropwise 18 parts of 98% sulfuric acid during the course of fifty minutes while the reaction temperature was held at 28°–32° C. The mixture was then stirred for eight hours at 30°–35° C. and poured into hot water. The oil layer was washed several times with hot water, once with hot dilute soda solution, and finally with water. The ethylene dichloride was evaporated off and the residual oil in an amount of 218 parts distilled at 3 mm. The p-tert.-butylphenoxydihydronordicyclopentadiene distilled over at 195°–205° C./3 mm. as a pale yellow viscous oil. Upon redistillation at 1 mm., it came over at 180° C. and formed a very pale yellow thick oil.

Example 5

To a stirred solution of 124 parts of guaicol and 10 parts of boron trifluoride-diethyl ether complex (BF₃·C₂H₅—O—C₂H₅), there was added dropwise 132 parts of dicyclopentadiene during the course of one hour while the reaction mixture was held at 29°–32° C. by cooling. The mixture was then stirred for five hours at room temperature, washed with hot water, and with soda solution, and distilled in vacuo. The guaicoxydihydronordicyclopentadiene, having the probable formula:

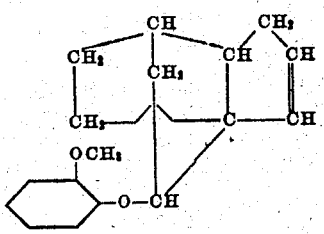

distilled at 175°–180° C./2 mm. as a colorless viscous oil. The yield was 121 parts. Upon redistillation, it boiled at 172°–176° C./2 mm.

Example 6

To a stirred solution of 122 parts of p-ethyl phenol and 132 parts of dicyclopentadiene at 33° C., there was gradually added 20 parts of boron trifluoride-diethyl ether complex during the course of twenty minutes. After about ten parts had been added, a vigorous exothermic reaction set in which raised the temperature to about 60° C. and necessitated cooling with ice to moderate the reaction. The mixture was stirred for five hours longer, then washed with hot water and with soda, and distilled in vacuo. The product, p-ethylphenoxydihydronordicyclopentadiene, distilled at 175° C./2 mm. as a colorless viscous oil in a yield of 70 parts.

Example 7

To a stirred solution of 128 parts of p-chlorophenol and 10 parts of boron trifluoride-diethyl ether complex, there was gradually added 132 parts of dicyclopentadiene while the mixture was cooled and the reaction temperature maintained at 30°–40° C. The mixture was stirred thereafter for three hours and then washed with hot water and with soda solution. An oil layer was separated, dried, and distilled in vacuo. The product, p-chlorophenoxydihydronordicyclopentadiene, distilled at 165°–175° C./2 mm. as a viscous, pale yellow oil in a yield of 107 parts. Upon redistillation, it boiled at 169°–174° C./2 mm. and solidified to a crystalline mass which, after recrystallization from methanol, formed colorless crystals melting at 55° C.

Example 8

To a stirred solution of 122 parts of 1,3,5-xylenol and 132 parts of dicyclopentadiene at 40° C., there was gradually added 10 parts of boron trifluoride-diethyl ether complex, during which time the temperature rose to 65° C. The mixture was stirred for three and one-quarter hours at room temperature, washed with hot water and with soda solution, and distilled in vacuo. The product, 3,5-dimethylphenoxydihydronordicyclopentadiene, distilled at 175°–180° C./3 mm. as a colorless oil in a yield of 136 parts.

Example 9

To a stirred solution of 49 parts of p-bromophenol and 37 parts of dicyclopentadiene at 35° C., there was added 1 part of boron trifluoride-diethyl ether complex. The exothermic reaction raised the reaction mixture to 75° C. The viscous mass obtained was washed with hot water and with soda solution, separated therefrom, taken up in toluene, and distilled in vacuo. The reaction product, p-bromophenoxydihydronordicyclopentadiene, distilled at 190°–195° C./3 mm. as a viscous oil which crystallized, on standing, in a yield of 46 parts. After recrystallization from methanol, it formed colorless crystals melting at 72° C.

Example 10

To a stirred solution of 55 parts of p-benzylphenol, 39.6 parts of dicyclopentadiene and 130 parts of ethylenedichloride, 2 parts of boron trifluoride-diethyl ether complex was added. An exothermic reaction set in which was controlled at 30°–35° C. by cooling. The mixture was then stirred for five hours at room temperature, washed with water, then with soda solution, dried, and distilled in vacuo. The resulting p-benzylphenoxydihydronordicyclopentadiene distilled at 230°–235° C./2 mm. as a viscous oil in a yield of 44 parts.

Example 11

A mixture of 49.2 parts of p-tertiary-amylpenol, 39.6 parts of dicyclopentadiene, and 2 parts of BF₃-diethyl ether complex was processed as described in Example 10. The resulting p-tert.-amylphenoxydihydronordicyclopentadiene boiled at 192°–194° C./3 mm.

Example 12

A mixture of 52.8 parts of p-cyclohexylphenol, 39.6 parts of dicyclopentadiene, and 2 parts of BF₃-diethyl ether complex was processed as described in Example 10. The resulting p-cyclohexylphenoxydihydronordicyclopentadiene boiled at 212°–216° C./2 mm. as a viscous colorless oil. Upon standing in ice-cold ethanol, it gradually crystallized and formed colorless crystals having a melting point of 59°–60° C.

Example 13

To a stirred solution of 72 parts of α-naphthol, 100 parts of ethylene dichloride, and 66 parts of dicyclopentadiene, cooled to 20° C., 3 parts of BF₃-diethyl ether was added. The temperature rose to 72° C. The mixture was stirred for twenty minutes, then washed with water, and with soda solution. The oil layer was separated, dried, and distilled in vacuo. The resulting α-naphthoxydihydronordicyclopentadiene distilled as a viscous oil at 210°–220° C./2 mm. in a yield of 45 parts. After this product had been taken up with methanol and left standing in an ice bath, crystals formed which were separated and recrystallized several times from ethanol. Colorless needle crystals were obtained, melting at 69° C.

Example 14

To a stirred solution of 114 parts of 2,4-dichlorophenol, 130 parts of ethylene dichloride, and 2 parts of BF₃-diethyl ether complex, there was added dropwise 92.4 parts of dicyclopentadiene at 25°–35° C. The mixture was then stirred for three hours at 35° C. It was washed with water and with soda solution, dried, and distilled in vacuo. The resulting 2,4-dichlorophenoxydihydronordicyclopentadiene distilled over at 190°–200° C./3 mm. as a colorless oil in a yield of 86 parts. Upon redistillation, it boiled at 175°–180° C./2 mm.

Example 15

To a stirred solution of 59.3 parts of 2,4,5-trichlorophenol, 130 parts of ethylene dichloride, and 2 parts of BF₃-diethyl ether complex, there was added dropwise 39.6 parts of dicyclopentadiene at 25° C. The mixture was stirred at 25° C. for three hours, then washed with water and with soda solution. The oil was separated, dried, and distilled in vacuo. The resulting 2,4,5-trichlorophenoxydihydronordicyclopentadiene distilled over at 195°–200° C./2 mm. as a colorless oil.

Example 16

To a stirred solution of 81.8 parts of 2-chloro-6-phenylphenol, 2 parts of BF₃-diethyl ether, and 130 parts of ethylene dichloride, there was gradually added 52.8 parts of dicyclopentadiene while the mixture was cooled to 30°–35° C. The mixture was then stirred for four hours at 30° C. and finally washed with hot water and with soda solution. The ethylene dichloride was then evaporated off in vacuo on a steam bath, and the residual oil distilled in vacuo. The resulting 2-chloro-6-phenylphenoxydihydronordicyclopentadiene distilled at 235°–240° C./2 mm. as a yellow oil in a yield of 51 parts.

Example 17

To a stirred suspension of 85 parts of p-phenylphenol, 500 parts of ethylene dichloride, and 3 parts of BF₃-diethyl ether complex, 66 parts of dicyclopentadiene was added. The temperature rose to 38° C. The mixture was stirred for five hours without cooling and then filtered from traces of insoluble p-phenylphenol. The filtrate was washed, dried, and distilled as in Example 16. The resulting p-phenylphenoxydihydronordicyclopentadiene distilled at 225°–230° C./2 mm. as a viscous pale yellow oil which rapidly crystallized. On recrystallization from ethanol, it formed colorless crystals melting at 119° C. The yield was 32 parts.

Example 18

Dicyclopentadiene (52.8 parts) was added gradually to a stirred solution of 81.8 parts of 2-chloro-6-phenylphenol, 100 parts of ethylene dichloride, and 2 parts of BF₃-diethyl ether at 30°–35° C. The mixture was stirred for two hours at 30° C., then washed with hot water and with soda solution, dried, and distilled in vacuo. The 2-chloro-6-phenylphenoxydihydronordicyclopentadiene boiled at 215°–220° C./2 mm. in a yield of 51 parts. Upon standing in ice-cold ethanol, it gradually crystallized and, after several recrystallizations, formed colorless crystals having a melting point of 60°–61° C.

Example 19

To a stirred solution of 100 parts of ethylene dichloride, 99 parts of crystalline tricyclopentadiene, and 94 parts of phenol, there was added gradually 5 parts of BF₃-diethyl ether complex while the mixture was cooled to 30°–35° C. The mixture was stirred for twenty-four hours at room temperature, then washed repeatedly with hot water and finally with soda solution. The ethylene dichloride was evaporated off and the residual oil (160 parts) distilled in vacuo. The phenoxydihydronortricyclopentadiene distilled over at 200°–225° C./3 mm. as a pale yellow viscous oil. Upon redistillation, it boiled at 196°–200° C./2 mm. in a yield of 65 parts of pure product.

In the same manner, phenols can be condensed with tetracyclopentadiene or pentacyclopentadiene to yield the corresponding aryloxydihydronortetra- or norpentacyclopentadienes.

In the presence of acid condensing agents, polycyclopentadienes of the formula:

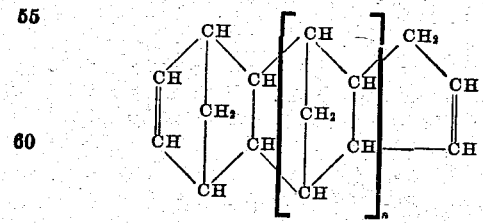

wherein $n$ is zero or a small whole number, such as 1, 2, or 3, react with monohydric phenols to form new aryl ethers of hydroxydihydronorpolycyclopentadienes. The reaction involves both an addition reaction and a rearrangement of the terminal endomethylene cycle of the polycyclopentadiene.

While the reaction has been shown as occurring primarily with monohydric phenols, it also occurs with polyhydric phenols. In the case of some dihydric phenols, definite products in moderate yields have been isolated, but the reaction in general tends toward formation of resinous ethers of undetermined structure. Trihydric phenols give resins almost exclusively.

The probable formula of the simplest aryl ethers may be represented by the following general formula:

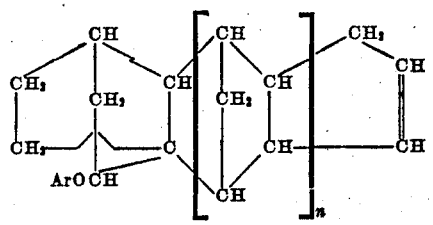

wherein Ar is an aryl nucleus and $n$ has a value from zero to a small integer. The ethers formed from dicyclopentadiene have the formula $$ArOC_{10}H_{13}$$

and are characterized by the presence of the aryl ether group on one terminal cycle and of an olefinic bond in the opposite terminal cycle of nordicyclopentadienyl nucleus.

Although in the above examples practically pure polycyclopentadienes have been used, the process shown may also be applied to mixtures of hydrocarbons which contain 5% or more of the polycyclopentadienes having two double bonds per molecule, such as are obtained in the thermal cracking of petroleum or in the manufacture of water gas. The reaction of the polycyclopentadienes provides a new means for separating the components of mixtures of unsaturated hydrocarbons and gives new utility to such products.

I claim:

1. An acid-catalyzed, addition-rearrangement product of an aromatic benzenoid compound having a phenolic hydroxyl group and a crystalline polycyclopentadiene having two double bonds and one to four endomethylene cycles per molecule, said product being a dihydronorpolycyclopentadienyl ether of said benzenoid compound.

2. An acid-catalyzed, addition-rearrangement product of a phenol and crystalline polycyclopentadiene having two double bonds and one to four endomethylene cycles per molecule, said product being a phenyl dihydronorpolycyclopentadienyl ether.

3. An acid-catalyzed, addition-rearrangement product of a phenol and dicyclopentadiene, said product being a phenyl dihydronordicyclopentadienyl ether.

4. An acid-catalyzed, addition-rearrangement product of chlorophenol and dicyclopentadiene, said product being chlorophenyl dihydronordicyclopentadienyl ether.

5. An acid-catalyzed, addition-rearrangement product of phenol and dicyclopentadiene, said product being phenyl dihydronordicyclopentadienyl ether.

6. An acid-catalyzed, addition-rearrangement product of phenol and tricyclopentadiene having two double bonds and two endomethylene cycles per molecule, said product being phenyl dihydronortricyclopentadienyl ether.

7. A method of preparing aryloxydihydronorpolycyclopentadienes having an ether group in an endoethylene cyclopentano group as one terminal cycle and an olefinic linkage in a five-membered ring as the opposite terminal cycle of the norpolycyclopentadienyl nucleus which comprises reacting at 25° to 50° C. in the presence of an acidic condensing agent an aromatic benzenoid compound having a phenolic hydroxyl group and a crystalline polycyclopentadiene having two double bonds and one to four endomethylene cycles per molecule.

8. A method of preparing an aryloxydihydronordicyclopentadiene having an ether group in an endoethylene cyclopentano group as a terminal cycle and an olefinic linkage in a five-membered ring as the oppposite terminal cycle of the nordicyclopentadienyl nucleus which comprises reacting at 25° to 50° C. in the presence of an acidic condensing agent an aromatic benzenoid compound having a phenolic hydroxyl group and a crystalline dicyclopentadiene having two double bonds per molecule.

9. A method of preparing a phenoxydihydronordicyclopentadiene having the formula $ArOC_{10}H_{13}$, wherein Ar is a phenyl nucleus and —$C_{10}H_{13}$ is a dihydronordicyclopentadienyl group, the oxygen atom being attached to the endoethylene cyclopentano ring thereof, which comprises reacting in the presence of an acidic condensing agent at a temperature of 25° to 50° C. a monohydric phenol and crystalline dicyclopentadiene.

10. A method of preparing a phenoxydihydronortricyclopentadiene having a phenyl ether group attached to an endoethylene cyclopentano group as one terminal cycle and having an olefinic linkage in a five-membered ring as the opposite terminal cycle of the nortricyclopentadienyl nucleus which comprises reacting a monohydric phenol with crystalline tricyclopentadiene in the presence of an acidic condensing agent at a temperature of 25° to 50° C.

HERMAN A. BRUSON.